(12) United States Patent
Thacher et al.

(10) Patent No.: US 6,745,117 B1
(45) Date of Patent: Jun. 1, 2004

(54) POWER-LIMITING CONTROL METHOD AND SYSTEM FOR A WORK VEHICLE

(75) Inventors: Russell James Thacher, Monroe, NC (US); Chris Alan DeRoo, Charlotte, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/439,517

(22) Filed: May 16, 2003

(51) Int. Cl.[7] ............................................... B60K 31/02

(52) U.S. Cl. ......................... 701/50; 701/36; 180/65.8

(58) Field of Search ............................ 180/65.2, 65.3, 180/65.8; 701/1, 29, 35, 36, 50, 70, 99; 477/7

(56) References Cited

U.S. PATENT DOCUMENTS

| | | | | |
|---|---|---|---|---|
| 5,081,365 A | * | 1/1992 | Field et al. | 290/45 |
| 5,742,914 A | * | 4/1998 | Hagenbuch | 701/35 |
| 6,301,531 B1 | * | 10/2001 | Pierro et al. | 701/29 |
| 6,546,363 B1 | * | 4/2003 | Hagenbuch | 703/7 |
| 6,574,965 B1 | * | 6/2003 | Feulner | 60/785 |

* cited by examiner

*Primary Examiner*—Richard M. Camby

(57) ABSTRACT

A capacity estimator determines a total maximum allowable power storage capacity for a work vehicle. A timer times the operating time of the work vehicle in an electrically propelled mode. A load manager, a driver or both decrease the available power to at least one of a drive motor of the work vehicle and an ancillary load over the operating time to conserve the available power stored for operating at least one critical work vehicle.

24 Claims, 5 Drawing Sheets

US 6,745,117 B1

POWER-LIMITING CONTROL METHOD AND SYSTEM FOR A WORK VEHICLE

FIELD OF THE INVENTION

This invention relates to a power-limiting control method and system for a work vehicle.

BACKGROUND OF THE INVENTION

Up to the present time, many work vehicles have been powered by internal combustion engines, such as diesel engines. For the future, hybrid vehicles offer promise for compliance with evolving exhaust emission regulations in the United States and other countries. A hybrid vehicle may be used for both an internal combustion engine and an electrical drive motor for propulsion. Typically, the internal combustion engine operates to generate power for operation of one or more electric drive motors. In one configuration of a hybrid vehicle, the internal combustion engine may be turned off and the vehicle may operate electrically in a quiet mode by extracting electrical energy stored in batteries. Although work vehicles could potentially be propelled electrically, solely by electrical motors and batteries, the weight of batteries and the charge capacity limits the useful range and duty cycle of such vehicles.

Fuel cells may be used to replace batteries as the primary electrical energy source of a vehicle. Fuel cells may be used to convert hydrogen into electrical energy. However, fuel cells remain expensive to manufacture, which is an obstacle to their introduction to their broad market acceptance. Even if fuel cells become commercially viable for work vehicles, the maximum range and maximum working time of the fuel-cell vehicle may be limited by the storage capacity of tanks for storing compressed gas (e.g., hydrogen). Thus, a need exists for managing power consumption to enhance the longevity of operation of electrically powered and hybrid work vehicles.

SUMMARY OF THE INVENTION

In accordance with one embodiment of the method and system of the invention, a capacity estimator determines a total maximum allowable power storage capacity for a work vehicle. A timer times the operating time of the work vehicle in an electrically propelled mode, where energy for propulsion is obtained materially, primarily or entirely from an energy storage device. A load manager, a driver or both decrease the available power to at least one of a drive motor of the work vehicle and an ancillary load over the operating time to conserve the available power stored for operating at least one critical load of the work vehicle.

DESCRIPTION OF THE PREFERRED EMBODIMENT

A work vehicle refers to any vehicle, truck, agricultural equipment or machine, construction equipment or machine, military equipment, commercial and consumer equipment, mowers, mass-transit vehicle, passenger vehicles, logging equipment or other mobile equipment that is propelled in whole or in part by one or more electrical drive motors.

Figure 1:
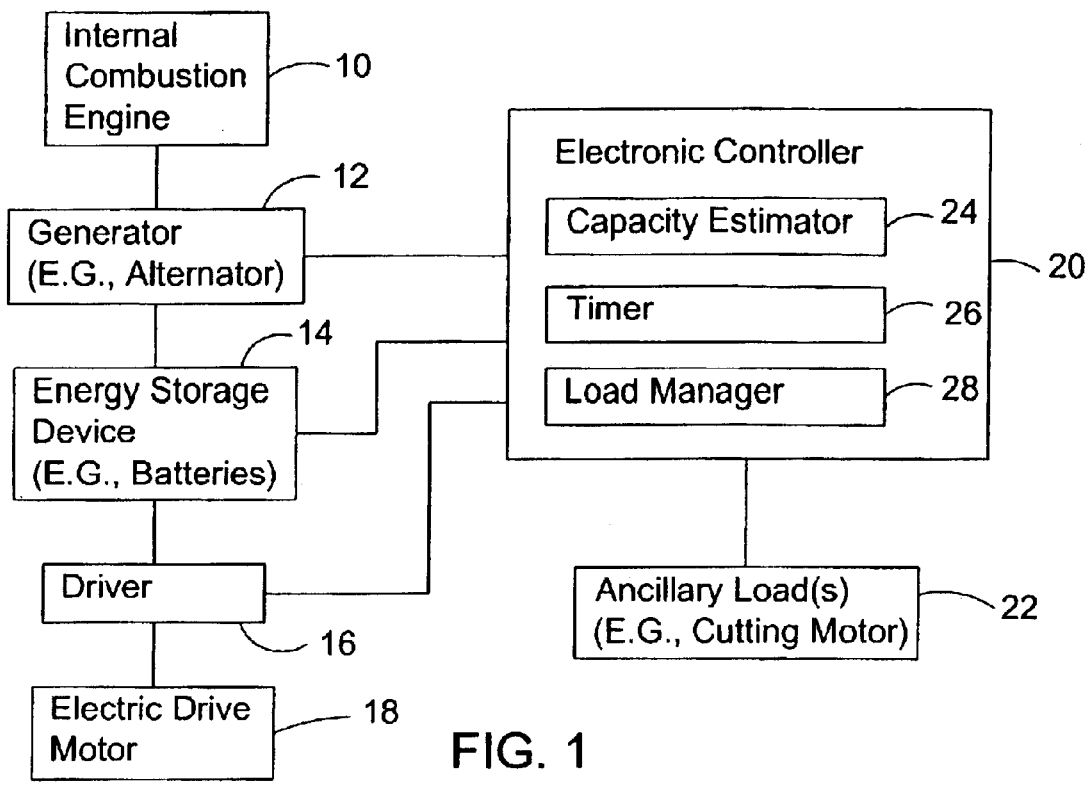
FIG. 1 is a block diagram of a power-limiting control system for a hybrid work vehicle.

FIG. 1 is a block diagram of one embodiment of a control system for limiting the electrical power consumption of a work vehicle. The control system comprises an internal combustion engine 10 that mechanically drives a generator 12. The generator 12 is electrically coupled to an energy storage device 14 to charge the energy storage device 14. The generator 12 may comprise a generator or an alternator, for example. A driver 16 is coupled to the energy storage device 14 and controls the presence, absence or any other aspect of electrical energy to the electric drive motor 18. An electronic controller 20 may communicate with one or more of the following: the generator 12, the energy storage device 14, the driver 16, and an ancillary load 22.

In one embodiment, the electronic controller 20 comprises a capacity estimator 24, a timer 26, and a load manager 28. The capacity estimator 24 is arranged to estimate a remaining charge capacity of the energy storage device 14. The energy storage device 14 means batteries, dry cells, another device for electrochemical storage of electrical energy or another mechanism for storing or providing electrical energy. The timer 26 may be used to measure the cumulative operating time, the latest operational time duration, or both, of the vehicle. The latest operational time may represent an operational duration from the last time that the work vehicle was activated, whereas the cumulative operating time represents the sum of operational times since the last partial or complete recharge of the energy storage device. The load manager 28 may provide a control signal to the driver 16, the ancillary load 22, or both, for regulating or controlling power consumption of the vehicle.

In one embodiment, the capacity estimator 24 comprises a state-of-charge (SOC) estimator. The SOC represents the remaining capacity of a battery or energy storage device 14 in a charge/discharge cycle SOC represents the ratio of the remaining capacity to the full charge capacity of a cycle-aged battery. In one embodiment, the SOC of the energy storage device 14 may be estimated by measuring current drain and voltage level at regular intervals. In another embodiment, the SOC may be based on a battery model that takes into account one or more of the following: charging voltage, charging time, charging temperature, discharge rate, discharge temperature, charge recovery, cycle aging, electrochemical composition factors, and an electrical equivalent circuit.

In one embodiment, the energy storage device 14 comprises a lithium-ion or lithium-hydride batteries. In another embodiment, the energy storage device 14 comprises lead acid batteries, although the batteries may have any chemical composition and still fall within the scope of the invention.

In one embodiment, the driver 16 comprises an amplifier, a controller, an inverter or the like. The driver 16 may have an analog output signal, a digital output signal or both. The driver 16 may provide a direct current output, an alternating current output, a pulse-width-modulated (PWM) output, a sinusoidal wave output, a rectangular or square wave output or some other suitable output that is paired with or compatible with the electric drive motor 18. The output should be capable of one or more of the following: regulating the power consumption of the electric drive motor. 18, controlling the speed of the electric drive motor 18, controlling the torque of the electric drive motor 18, and controlling the duty cycle of the electric drive motor 18.

The electric drive motor 18 may comprise an alternating current motor, an induction alternating current motor, a synchronous alternating current motor, a switched reluctance motor, a direct current motor, a brushed direct current motor, a brushless direct current motor or any other type of motor.

The selection of the underlying technology of the electric driver motor 18 may be based upon the specifications and application of the work vehicle. For example, an induction machine may be used for larger traction drives, but a brushless permanent magnet machine may be used where smaller, more compact drive motors are needed, such as powering the cutting reels on a mower, as the work vehicle, the total maximum storage capacity of the energy storage device 14, or both.

The capacity estimator 24 determines or estimates a total maximum allowable power draw for a work vehicle, the total maximum storage capacity of the energy storage device 14, or both. In one embodiment, the load manager 28 comprises a classifier for classifying power loads of the work vehicle into one or more critical power loads and at least one less critical power load (e.g., non-critical power load). A timer 26 times the operating time of the work vehicle in an electrically propelled mode, where the vehicle materially or solely extracts stored energy from the energy storage device 14. A controller allocates the available power between one or more critical power loads and one or more non-critical power loads according to the operating time. In another embodiment, a controller decreases the available power to at least one drive motor of the work vehicle over the operating time to conserve the available power stored for operating at least one critical load of the work vehicle.

The electronic controller 20 sends a signal to the driver 16 to limit the power consumption of the electric drive or the electric drive motors 18 of the vehicle. In electric drive systems, the interface between the power source (e.g., batteries, generator or fuel cell) and the power consumer (e.g., electric drive motor 18) may be a driver 16 for controlling the electric drive motor 18. The driver 16 may limit power consumed by the driver motor 18 in accordance with a prodigious assortment of techniques. The load manager 28 of the controller may send a logic signal to the motor driver 16 that limits the maximum velocity of the motor, the maximum torque, or both. The power of the motor is proportional to the torque multiplied by the speed. The power consumption of the electric drive motor 18 may be regulated or modulated through current, voltage, frequency, and/or duty cycle outputted by the driver 16.

Figure 2:
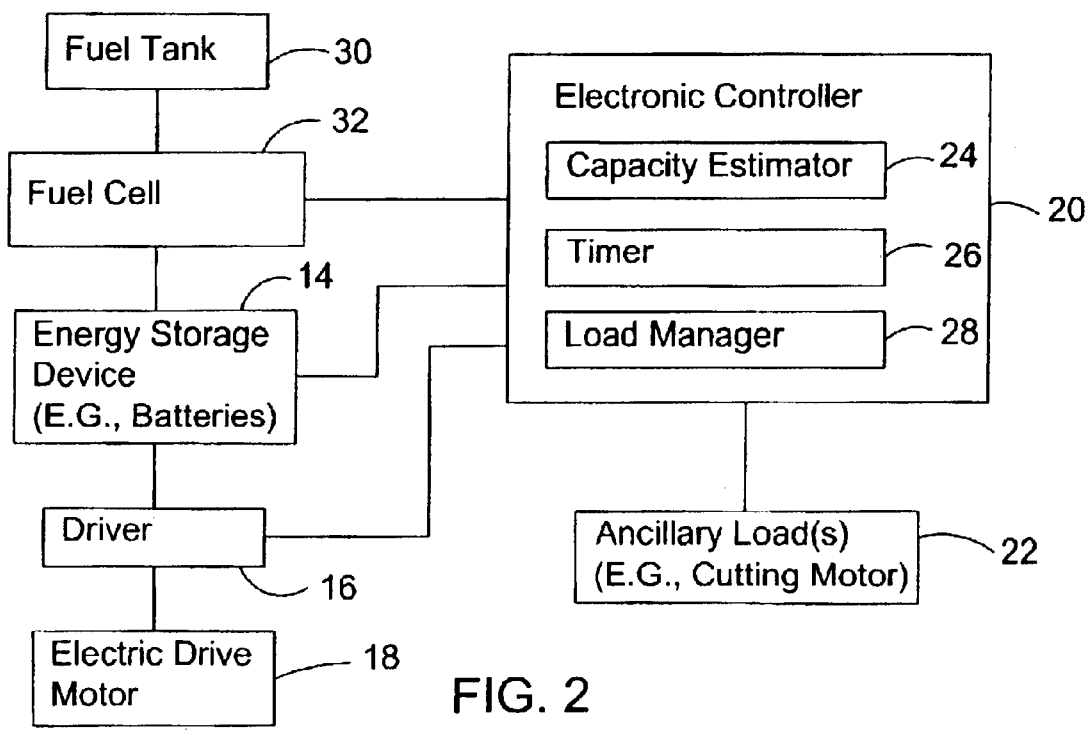
FIG. 2 is a block diagram of an alternate embodiment of a power-limiting control system for a fuel-cell work vehicle.

The control system of FIG. 2 is similar to the control system of FIG. 1, except the internal combustion engine 10 and the generator 12 of FIG. 1 are replaced by the fuel tank 30 and the fuel cell 32 of FIG. 2. Electric hybrid and fuel cell powertrains are similar, in the sense that both currently have two sources from which to draw power from: (1) the prime mover (engine-driven generator or fuel cell 32) or (2) onboard batteries. It is desirable to have an operator-selectable "quiet" or "indoor" mode (both referred to as quiet mode for convenience), where the prime mover is only activated when the batteries are completely drained. The problem with operating in quiet mode continuously is that power is drawn entirely from onboard batteries and running time is limited. This capability provides the customer to operate his work machine in areas where noise and/or emissions generated by the prime mover are objectionable. Two examples of the utility of this mode are: (1) mowing equipment on golf courses, where noise is to be avoided at all costs and (2) a utility vehicle operating in a warehouse setting, where engine exhaust is a problem.

Figure 3:
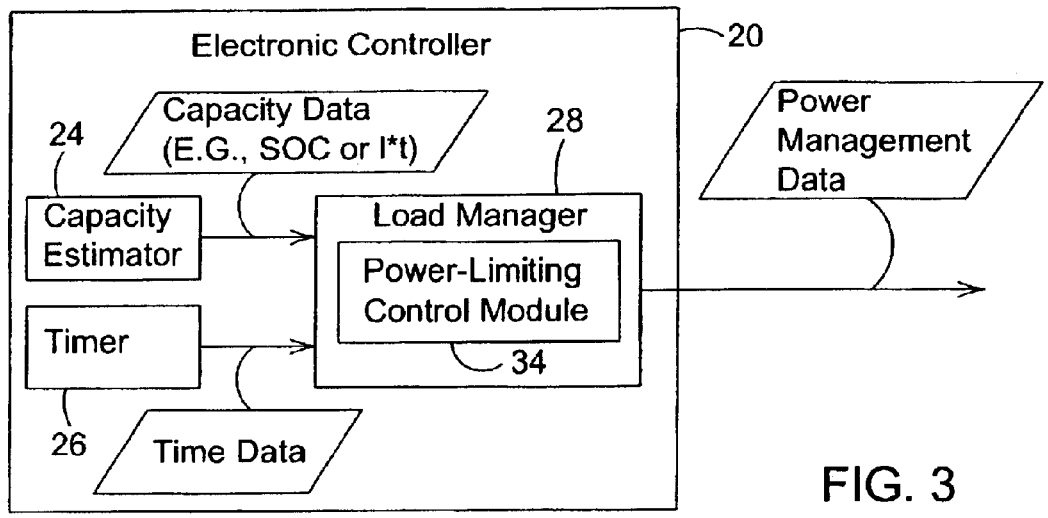
FIG. 3 is a block diagram of one possible embodiment of an electronic controller, consistent with the configuration of FIG. 1 or FIG. 2.

FIG. 3 shows the electronic controller 20 of FIG. 1 and FIG. 2 in greater detail. The electronic controller 20 of FIG. 3 includes a load manager 28 that accepts input data from a capacity estimator 24 and a timer 26. The load manager 28 includes an adaptive power-limiting control module 34. The adaptive power-limiting control module may comprise an algorithm, software instructions or software code or the like that is executable by the load manager 28, the controller 20 or both. The load manager 28 provides output data to at least one of the driver 16 and the ancillary loads 22.

In one embodiment, the input data comprises capacity data and operating time data. The capacity data may comprise SOC or a factor of the energy storage device 14 or a storage capacity merit factor. The storage capacity merit factor may be defined as a rating that is proportional to current multiplied by vehicular operating time or propulsion time, for instance. Further, the output data may comprise power management data.

Figure 4:
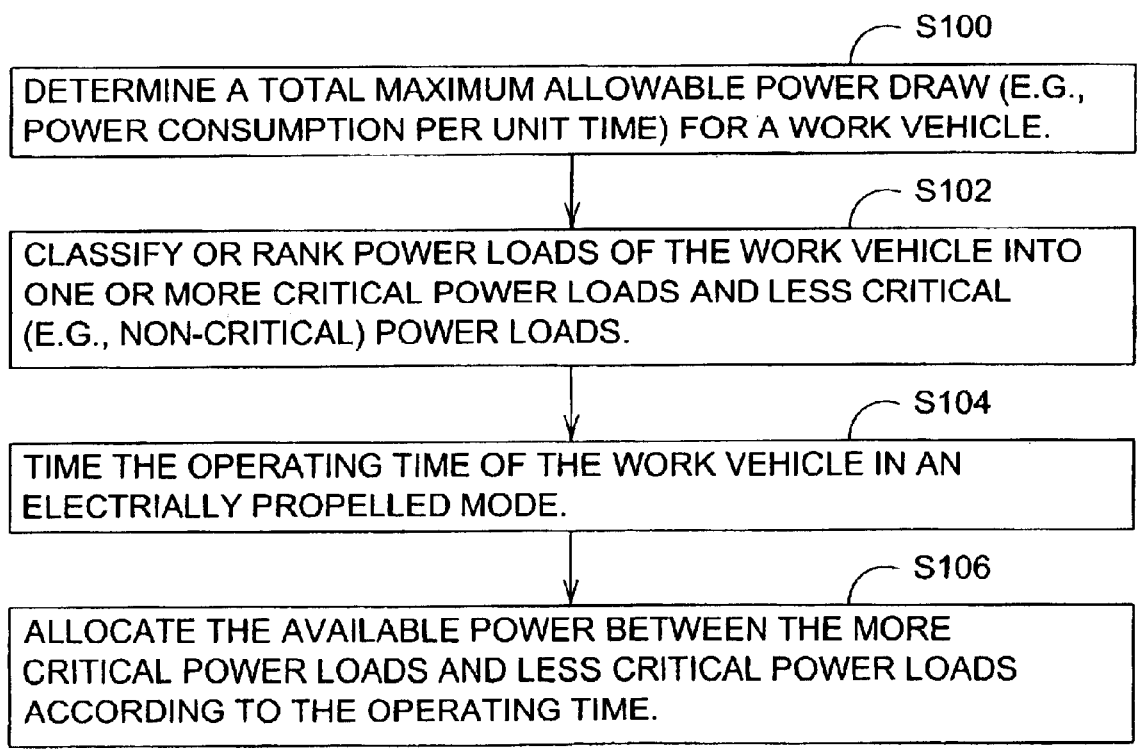
FIG. 4 is a flow chart of one embodiment of a method for limiting the power consumption of a work vehicle.

FIG. 4 illustrates a flow chart for a method of controlling power consumption of a work vehicle. The method of FIG. 4 starts in step S100.

In step S100, a capacity estimator 24 determines a total maximum allowable power draw for a work vehicle. The total maximum allowable power draw may be defined in terms of power consumption per unit time (e.g., Kilowatt/hour or Amp×Hours).

In step S102, a load manager 28 or power classifier classifies or ranks power loads of the work vehicle into one or more critical power loads and at least one less critical (e.g., non-critical) power load.

In step S104, a timer 26 times the operating time of the work vehicle in an electrically propelled mode, where the vehicle solely, primarily or materially extracts stored energy from the energy storage device 14 for the propulsion of the vehicle. Material extraction means that the amount of energy extracted is not replaced or counterbalanced by the in-flow of energy to charge the energy storage device 14 during movement of the vehicle.

In step S106, an electronic controller 20 allocates the available power between one or more critical power loads and one or more less critical power loads according to the operating time. In accordance with a first technique, the allocation to the non-critical loads is decreased or eliminated in conformance with a generally linear mathematical function between maximum allowable power draw versus time in the electrically propelled mode such that the vehicular power consumption is generally reduced or minimized over a particular operating time. Accordingly, the available operating time of the vehicle may be increased.

In accordance with a second technique, the allocation to the non-critical loads is decreased or eliminated such that the total maximum power draw is decreased in accordance with a graphical map of maximum allowable power draw versus time in the electrically propelled mode.

In accordance with a third technique, the allocating comprises limiting the maximum velocity of an electrical drive motor 18 as a non-critical load and allowing power to be drawn by a motor for moving a motor blade as a critical load. In accordance with a third technique, the allocating comprises limiting the maximum torque of an electrical drive motor 18 as a non-critical load and allowing power to be drawn by a motor for moving a motor blade as a critical load.

In accordance with a fourth technique, to maximize running time in quiet mode, the controller 20 may decrease the performance of one or more non-critical machine loads in a graduated, controlled fashion, so as to preserve power for critical machine function(s). For example, in a mower (e.g., a greens mower) when the operator selects quiet mode, the disclosed algorithm operates within the electronic controller to reduce maximum allowable power draw from the electric drive motor 18 (e.g., wheel drive motors) so the mowing unit motors may continue to operate at optimal speed/load. Where no auxiliary loads are present because of the nature or configuration of the vehicle (e.g., a utility vehicle), once a quiet mode is activated, the maximum allowable power draw by the wheel motors could simply be reduced in a gradual and controlled fashion to preserve battery capacity in accordance with the method of FIG. 5.

Figure 5:
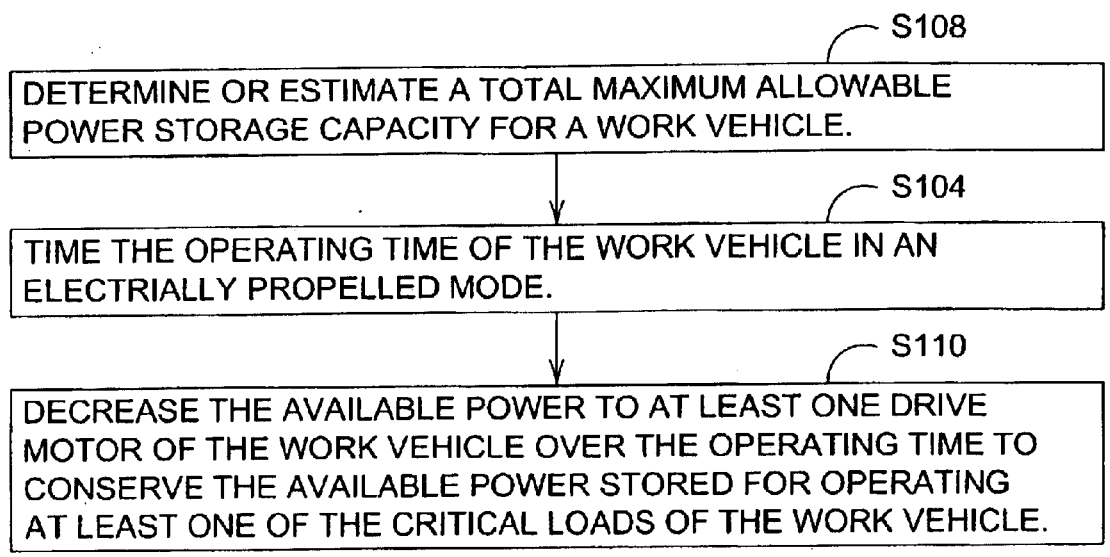
FIG. 5 is a flow chart of another embodiment of a method for limiting the power consumption of a work vehicle.

FIG. 5 illustrates a flow chart for a method of controlling power consumption of a work vehicle. The method of FIG. 5 begins in step S108.

In step S108, a capacity estimator 24 determines or estimates a total maximum allowable power storage capacity for a work vehicle. The total maximum allowable storage capacity may be defined in terms of power consumption per unit time (e.g., Kilowatt/hours or Amp×Hours), full charge capacity of a battery as a storage device 14, full design charge of a battery as the storage device 14, and full charge capacity of a battery de-rated for aging or the number of charge cycles.

In step S104, a timer 26 times the operating time of the work vehicle in an electrically propelled mode, in which the electric driver motor 18 receives energy primarily, solely or materially from the energy storage device 14 without offsetting, replenishing or otherwise fully counterbalancing the energy consumed or depleted from the energy storage device 14 during movement or operation of the vehicle.

In step S110, the electronic controller 20 decreases the available power to at least one drive motor 18 of the work vehicle over the operating time to conserve the available power stored for operating at least one critical load of the work vehicle. The decreasing of the available power may be carried out in accordance with various alternative techniques, some of which may be cumulatively executed together. In accordance with a first technique, the electronic controller 20 sends a signal or data to a driver 16 for limiting a maximum rotational velocity of the drive motor 18 to decrease vehicular power consumption. In accordance with a second technique, the electronic controller 20 sends a signal or data to a motor driver 16 for changing a frequency of a signal to an alternating current motor to limit a maximum rotational velocity of a motor to decrease or minimize vehicular power consumption. In accordance with a third technique, the electronic controller 20 sends a signal or data to a motor driver 16 for changing a digital signal to a direct current motor to limit a maximum rotational velocity of the motor to decrease vehicular power consumption. In accordance with a fourth technique, the electronic controller 20 sends data or a signal to a motor driver 16 to limit at least one of the maximum current draw and the maximum voltage applied to the motor to limit the power consumption of the electric drive. Although the method of FIG. 5 is simply and readily applied to virtually any electrically propelled work vehicle, other methods described herein offer greater control of power consumption of the work vehicle by adaptive control techniques or other power limiting techniques, such as defined by classification of critical and non-critical loads and allocating the remaining electrical power among them.

Figure 6A:
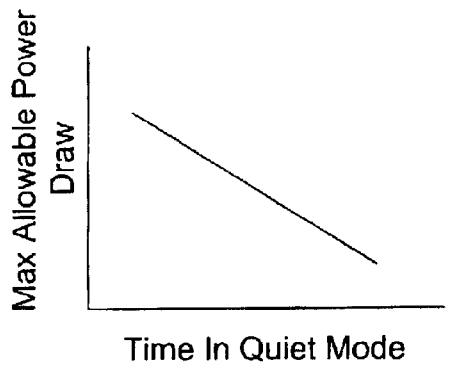
FIG. 6A, FIG. 6B, and FIG. 6C are charts of maximum allowable power draw versus time in a quiet mode.
Figure 6B:
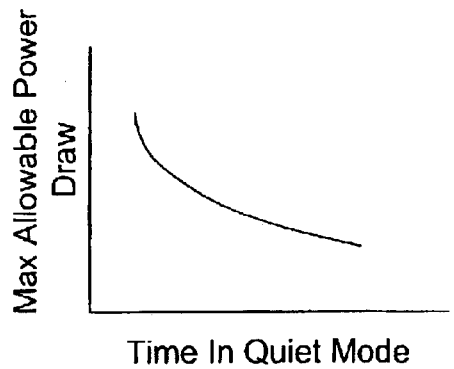
Figure 6C:
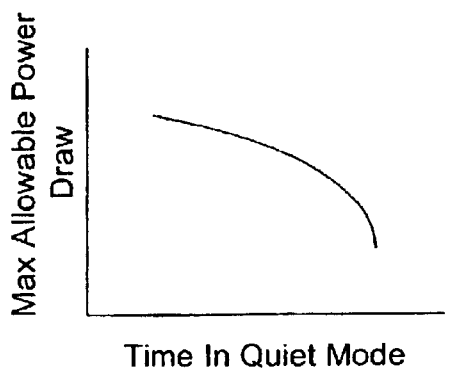

FIG. 6A, FIG. 6B, and FIG. 6C illustrate various alternate graphs of maximum allowable power draw versus time that may be used by the load manager 28 or the electronic controller 20 to reduce the power available to a drive motor 18, an auxiliary load 22, or both, to carry outstep S110 of FIG. 5. FIG. 6A illustrates a decreasing linear relationship between maximum allowable power draw versus time; FIG. 6B represents a decreasing concave relationship between maximum allowable power draw versus time; FIG. 6B represents a decreasing convex relationship between maximum allowable power draw versus time.

The maximum power draw versus time of the driver motor may be reduced in accordance with the relationship in any selected graph among the alternate graphs of FIG. 6A, FIG. 6B or FIG. 6C. Accordingly, in the quiet mode, power output may be reduced to critical loads, noncritical loads, or both, in a pre-defined manner as a function of time. Although FIG. 6A and FIG. 6B may be used or any other power-limiting procedure may be used, the graphical relationship defined in FIG. 6C may provide a desired level of performance for applications where performance is not greatly sacrificed or restricted until in quiet mode for a long time.

Figure 7:
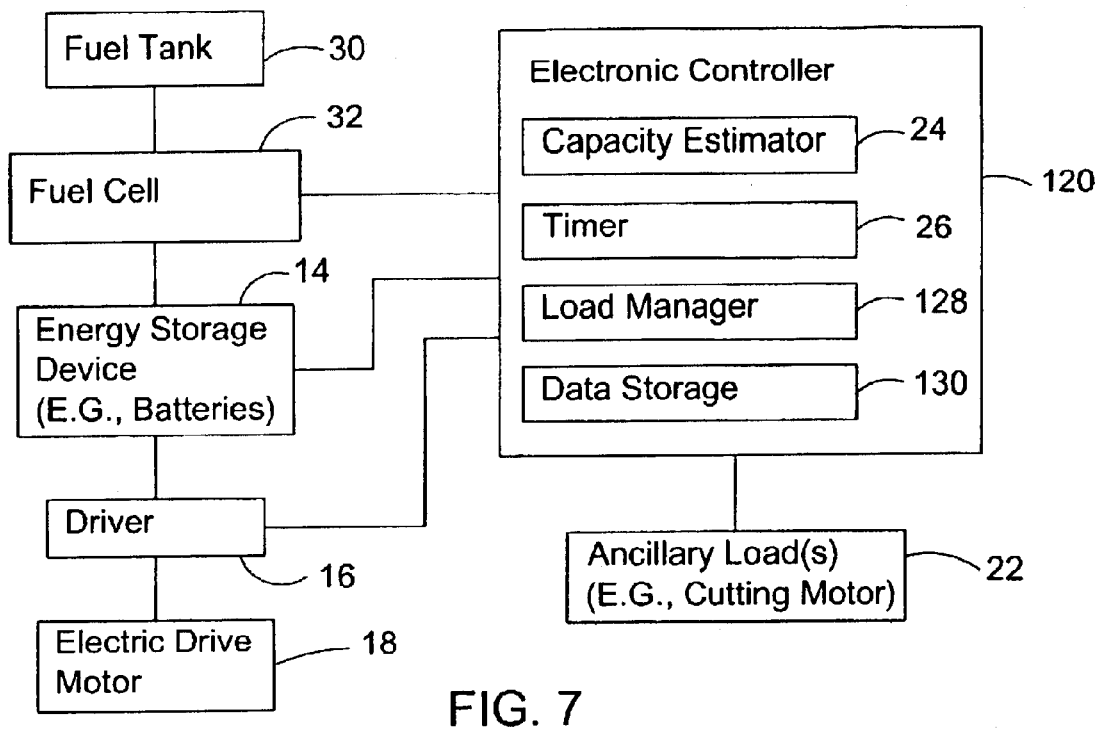
FIG. 7 is a block diagram of an alternate embodiment of a power-limiting control system for a hybrid work vehicle.

FIG. 7 illustrates a power-limiting control system that is similar to the power-limiting control system of FIG. 1, except the control system of FIG. 7 has an electronic controller 120 that includes data storage 130 for storing historical power draw data. The data storage 130 may comprise electronic memory, Read Only Memory (ROM), Random Access Memory (RAM), Flash RAM, optical data storage, magnetic data storage or any other suitable data storage medium. Like reference numbers in FIG. 7 and FIG. 1 indicate like elements. The historical power draw data relates to the loads of one or more of the following: electrical power consumption over time of one or more non-critical loads and electrical power consumption over time of one or more critical loads. In one embodiment, historical power draw data may include critical load identifiers, non-critical load identifiers, a ranking of critical load identifiers or a ranking of non-critical load identifiers. Further, the historical power draw data may include temporal data on respective critical load identifiers and non-critical load identifiers. Temporal data refers to one or more of the following items: time stamps, activation time, deactivation time, elapsed usage time, cumulative usage time or elapsed usage time after last recharge.

In one embodiment, the controller 120 may be associated with data storage 130 device. The controller 120 may support storage of an electrical load history of loading placed on the work vehicle versus time from historical operations in the electrically propelled mode. Accordingly, the controller 120 may decrease the available power to the drive motor 18 pursuant to at least one of the maximum storage capacity, the operating time, and the load history. In one embodiment, the load history comprises a power draw over a time period immediately preceding operation in the electrically propelled mode.

Figure 8:
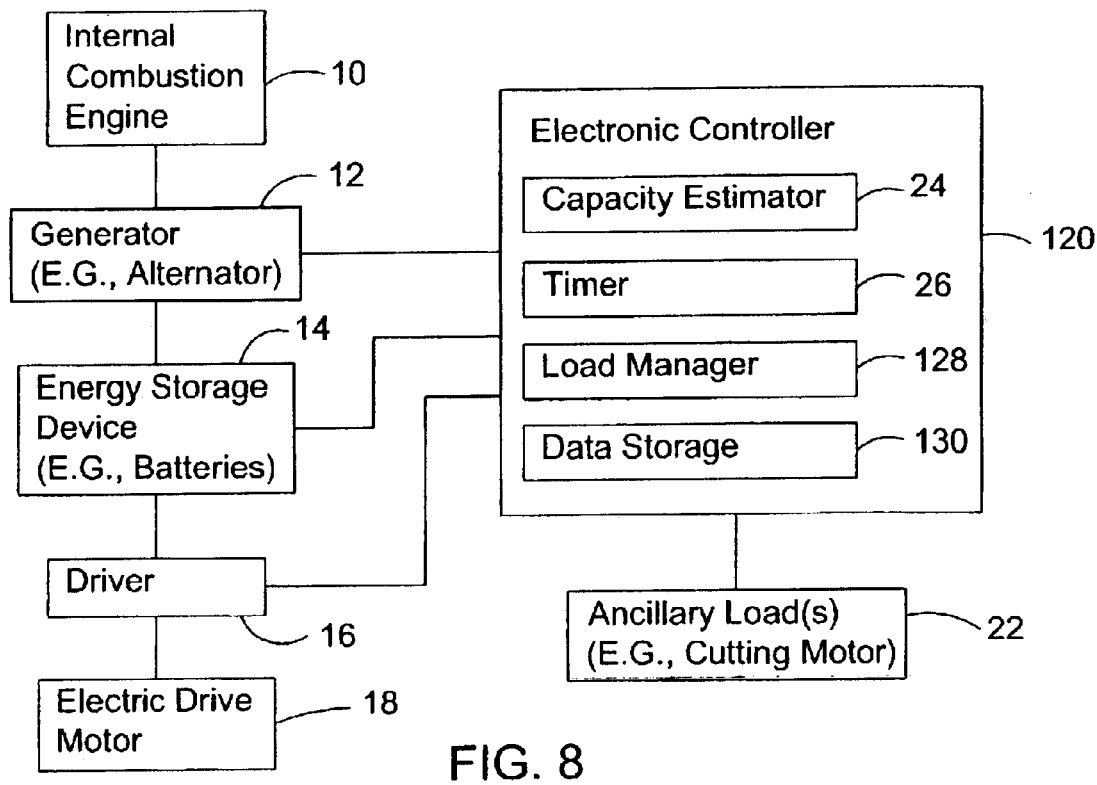
FIG. 8 is a block diagram of an another alternate embodiment of a power-limiting control system for a fuel-cell work vehicle.

FIG. 8 illustrates a power-limiting control system that is similar to the power-limiting control system of FIG. 2, except the control system of FIG. 8 has an electronic controller 120 that includes data storage 130 for storing historical power draw data. Like reference numbers in FIG. 8 and FIG. 2 indicate like elements. The historical power draw data relates to the loads of one or more of the following: electrical power consumption over time of a non-critical load and electrical power consumption over time of a critical load.

Figure 9:
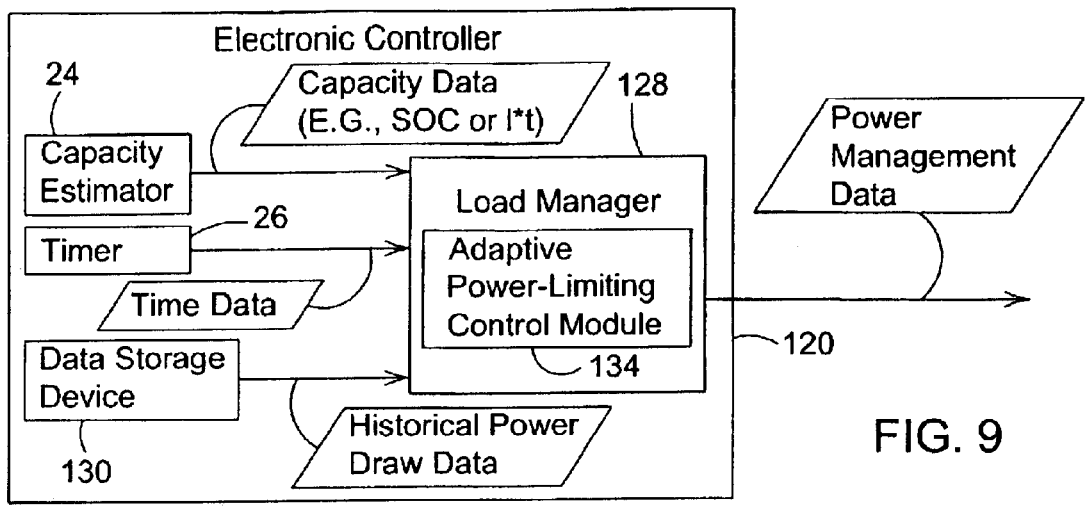
FIG. 9 a block diagram of an alternate embodiment of an electronic controller, consistent with the configuration of FIG. 6 or FIG. 7.

FIG. 9 shows the electronic controller 120 of FIG. 7 and FIG. 8 in greater detail. The electronic controller 120 of FIG. 9 includes a load manager 28 that accepts input data from a capacity estimator 24, a timer 26, and a data storage 130 device. The load manager 28 includes an adaptive power-limiting control module 134. The adaptive power control module 134 may comprise software instructions, software code for execution by the load manager 128 or the controller. The load manager 28 provides output data to at least one of the driver 16 and the ancillary loads 22.

In one embodiment, the input data comprises capacity data, operating time data, and historical power draw data. The capacity data may comprise SOC or a factor that is proportional to current multiplied by operating time, for instance. Further, the output data may comprise power management data.

Figure 10:
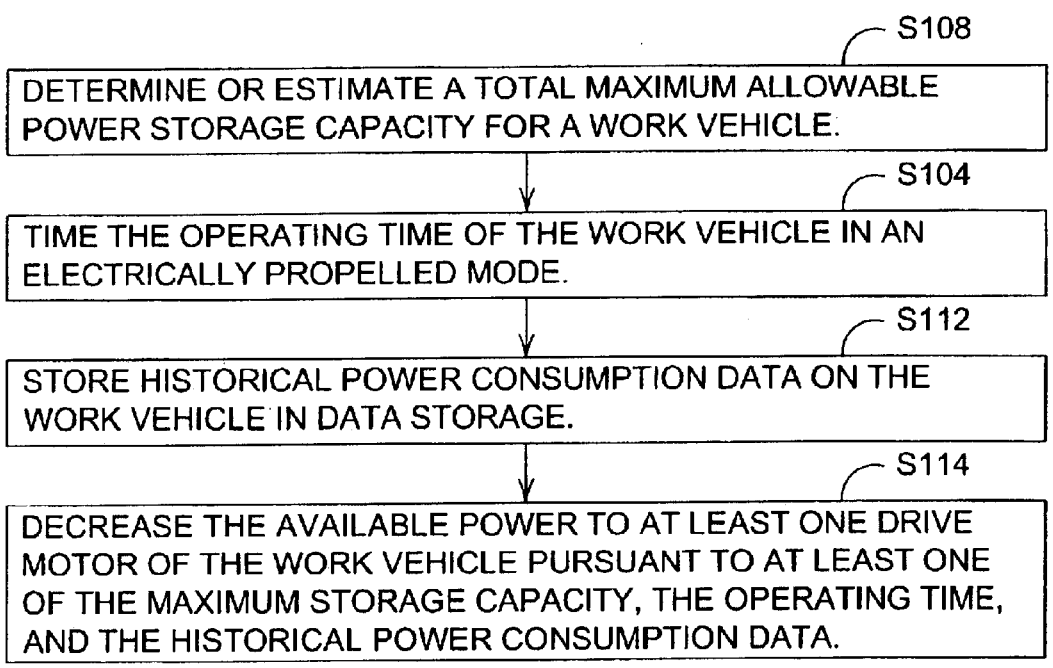
FIG. 10 is a flow chart of a method for limiting the power consumption of a work vehicle.

FIG. 10 shows a method of limiting a power consumption of a work vehicle. Like reference numbers in FIG. 4 and FIG. 10 indicate like steps or procedures. The adaptive control scheme of FIG. 10 may adjust maximum power draw in quiet mode based not only upon measured battery capacity, but on historical power draw data as well. The method of FIG. 10 begins in step S108.

In step S108, a capacity estimator 24 determines or estimates a total maximum allowable power storage capacity for a work vehicle.

In step S104, a timer 26 times the operating time of a work vehicle in an electrically propelled mode in which power is drawn solely, materially or primarily from an energy storage device 14 without counterbalancing recharging or power input to the energy storage device 14 of the work vehicle.

In step S112, historical power draw data or historical power consumption data is maintained or otherwise stored in data storage 130 on the work vehicle. The historical power draw data or historical power consumption data may comprise an electrical load history of electrical load versus time from historical operations in the electrically propelled mode.

In step S114, the available power to the drive motor is decreased pursuant to at least one of the maximum storage capacity, the operating time, and the historical power consumption data. In one embodiment, historical power consumption data comprises a power draw over a time period immediately preceding operation in the electrically propelled mode.

For example, the onboard electronic controller (20 or 120) could maintain a time history of power draw characteristics from past engagements of quiet mode, and the disclosed algorithm could use this history profile to further refine its setting of the power draw limit for non-critical devices. In another example, the electronic controller (20 or 120) could also make or use recent usage history based on historical power consumption data recorded for a set or predetermined length of time. Parameters would be extracted from the historical power consumption data for input into any power management scheme previously described herein.

Any combination of procedures may be used to manage the power consumption of work vehicle. For example, if a vehicle encounters a situation which may preclude use of a certain preferred scheme, the system may then default to an alternate scheme for limiting the power draw. If a vehicle is initially powered up and the preferred scheme for power limiting is adaptive with respect to its recent power utilization history, as described in the method of FIG. 10, no immediate usage history may be available under certain circumstances. In this case, the vehicle controller (20 or 120) may default to either the method of FIG. 4 or FIG. 5 based on the software instructions associated with the controller to establish a work history or historical power draw data for subsequent use in accordance with FIG. 10.

Figure 11:
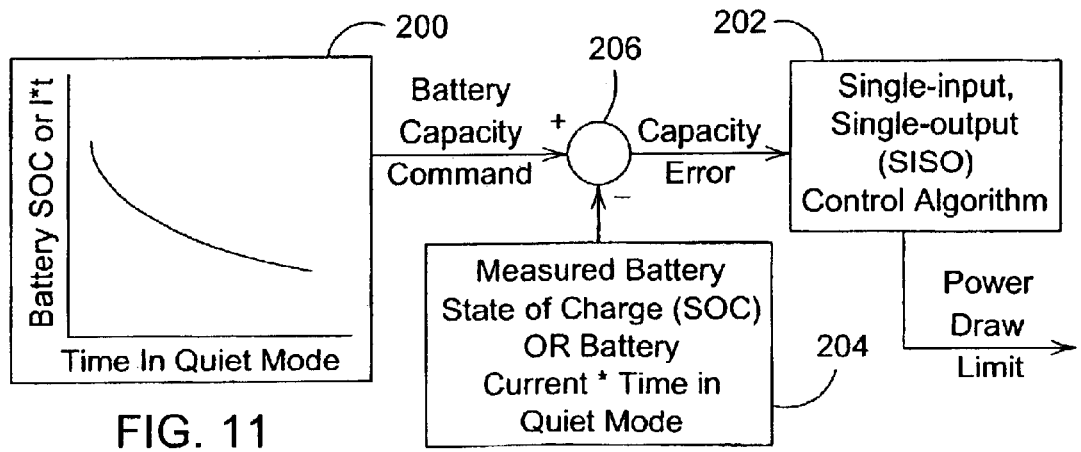
FIG. 11 is an illustrative diagram of the logic within the power limiting control module.

FIG. 11 illustrates adaptive feedback control which may be used in accordance with any of the embodiments of the system or method described herein. The electronic controller (20 or 120) may use a feedback control technique for limiting power draw of an electric drive 18, an ancillary load 22, or both, in accordance with the methods of FIG. 4 and FIG. 10, for example. In FIG. 11, box 200 represents maximum capacity level data that is outputted by the capacity estimator 24. Box 202 represents a measured state-of-charge (SOC) or another measured status indicator on the current charge level or remaining charge level of the energy storage device 14. The difference between the maximum capacity level and the remaining charge level represents an error output level that may be used directly or indirectly to generate a control signal for controlling the driver 16. In turn, the driver 16 controls the electric motor 18 based on the error output level to reduce power consumption of the electrically propelled vehicle. By making use of the feedback control techniques of FIG. 11, any of the power-limiting control methods and system embodiments of this invention may realize improved energy efficiency and utilization. However, in practice, the use of feedback may require additional hardware, such as sensors for indicating the current state-of-charge measurements on a generally real-time or instantaneous basis and input/output (I/O) interfaces of the electronic controller (20 or 120) to support such SOC measurements.

Battery life of the batteries or longevity of the charge or latest recharge of the energy storage device 14 may be extended by following the methods and systems taught herein. Further, while operating in the quite mode, longevity of the charge of the energy storage device 14 may be greatly extended through use of various embodiments of the method and system disclosed herein to increase available operational time for the vehicle before a next recharge of the energy storage device 14 is necessary or the vehicle is disabled because of an unanticipated discharge. The range of vehicular travel for the quiet mode may be increased, while maintaining critical vehicular functions (e.g., cooling and lubrication of conveyance mechanism).

Vehicular range extension is not the only benefit that accrues to the operator or owner of a work vehicle that incorporates concepts of the present invention described herein. For example, a mower (e.g., golf-course or greens mower), as the work vehicle, may decrease electrical power available to the drive motor (e.g., electrical drive motor 18) at a greater rate than the decrease of available electrical power to the electrical motor (e.g., ancillary load 22) that drives a cutting blade to maintain cut quality of grass or vegetation cutting.

Having described the preferred embodiment, it will become apparent that various modifications can be made without departing from the scope of the invention as defined in the accompanying claims.

What is claimed is:

1. A method of controlling power consumption of a work vehicle, the method comprising:

determining a total maximum allowable power draw for a work vehicle;

classifying power loads of the work vehicle into critical power loads and non-critical power loads;

timing the operating time of the work vehicle in an electrically propelled mode; and allocating the available power between the critical power loads and non-critical power loads according to the operating time.

2. The method according to claim 1 wherein allocating to the non-critical loads is decreased or eliminated such that the total maximum allowable power draw is decreased with an increase in the operating time in conformance with a generally linear mathematical function between maximum allowable power draw versus time in the electrically propelled mode.

3. The method according to claim 1 wherein the allocating to the non-critical loads is decreased or eliminated such that the total maximum power draw is decreased in accordance with a graphical map of maximum allowable power draw versus time in the electrically propelled mode.

4. The method according to claim 1 wherein the allocating comprises limiting the maximum velocity of a drive motor as a non-critical load and allowing power to be drawn by a motor for moving a motor blade as a critical load.

5. A method of controlling power consumption of a work vehicle, the method comprising:

determining a total maximum allowable power storage capacity for a work vehicle;

timing the operating time of the work vehicle in an electrically propelled mode; and decreasing the available power to at least one drive motor of the work vehicle over the operating time to conserve the available power stored for operating at least one critical load of the work vehicle.

6. The method according to claim 5 wherein the decreasing comprises sending a signal to a motor driver for limiting a maximum rotational velocity of a motor.

7. The method according to claim 5 wherein the decreasing comprises sending a signal to a motor driver for changing a drive frequency to an alternating current motor to limit a maximum rotational velocity of a motor.

8. The method according to claim 5 wherein the decreasing comprises sending a signal to a motor driver for changing a digital signal to a direct current motor to limit a maximum rotational velocity of the motor.

9. The method according to claim 5 wherein the decreasing comprises sending a signal to a motor driver to limit at least one of the maximum current draw and the maximum voltage applied to the motor to limit the power consumption of the electric drive.

10. The method according to claim 5 further comprising maintaining a load history of loading placed on the work vehicle versus time from historical operations in the electrically propelled mode.

11. The method according to claim 10 wherein the available power to the drive motor is decreased pursuant to at least one of the maximum storage capacity, the operating time, and the load history.

12. The method according to claim 10 wherein the load history comprises a power draw over a time period immediately preceding operation in the electrically propelled mode.

13. A system of controlling power consumption of a work vehicle, the system comprising:

a capacity estimator for determining a total maximum allowable power draw for a work vehicle;

a classifier for classifying power loads of the work vehicle into critical power loads and non-critical power loads;

a timer for timing the operating time of the work vehicle in an electrically propelled mode; and a controller for allocating the available power between at least one critical power load and at least one non-critical power load according to the operating time.

14. The system according to claim 13 wherein the controller decreases a total maximum allowable power draw of the at least one non-critical power load with an increase in the operating time in conformance with a generally linear mathematical function between the total maximum allowable power draw versus time of operation of the electrically propelled mode since a last recharge of an energy storage device.

15. The system according to claim 13 wherein the controller decreases the total maximum power draw of the at least one non-critical load in accordance with a graphical map of maximum allowable power draw versus operational time of the vehicle in the electrically propelled mode since a last recharge of an energy storage device.

16. The system according to claim 13 wherein the controller facilitates limiting a maximum velocity of a drive motor as the at least one non-critical load and allowing power to be drawn by an electrical motor as the at least one critical load; the electrical motor arranged to move a cutting blade and the drive motor arranged to propel the vehicle.

17. A system of controlling power consumption of a work vehicle, the system comprising:

a capacity estimator for determining a total maximum allowable power storage capacity for a work vehicle;

a timer for timing the operating time of the work vehicle in an electrically propelled mode; and a controller for decreasing the available power to at least one drive motor of the work vehicle over the operating time to conserve the available power stored for operating at least one critical load of the work vehicle.

18. The system according to claim 17 further comprising a driver coupled to the controller, the controller sending a signal to the driver for limiting a maximum rotational velocity of the drive motor to decrease the available power.

19. The system according to claim 17 further comprising a driver coupled to the controller, the controller sending a signal to the driver for changing a drive frequency of an input signal to an alternating current motor, as the drive motor, to limit a maximum rotational velocity of the driver motor.

20. The system according to claim 17 further comprising a driver coupled to the controller, the controller sending a signal to the driver for changing a digital signal to a direct current motor to limit a maximum rotational velocity of the drive motor.

21. The system according to claim 17 further comprising a driver coupled to the controller, the controller sending a signal to the driver to limit at least one of the maximum current draw and the maximum voltage applied to the driver motor to limit the power consumption of the drive motor.

22. The system according to claim 17 further comprising a data storage device associated with the controller; the data storage device maintaining a historical power consumption of loading placed on the work vehicle versus time from historical operations in the electrically propelled mode.

23. The system according to claim 22 wherein the available power to the drive motor is decreased pursuant to at least one of the maximum allowable power storage capacity, the operating time, and the historical power consumption data.

24. The system according to claim 22 wherein the historical power consumption data comprises a power draw over a time period immediately preceding operation in the electrically propelled mode.

* * * * *